July 3, 1928.

H. TITTENSOR 1,675,625

FORD TRANSMISSION SPEEDOMETER DRIVE

Filed Oct. 7, 1926

Inventor
Harry Tittensor
By Blackmore, Spencer & Heal
Attorneys

Patented July 3, 1928.

1,675,625

UNITED STATES PATENT OFFICE.

HARRY TITTENSOR, OF FLINT, MICHIGAN, ASSIGNOR TO A C SPARK PLUG COMPANY, OF FLINT, MICHIGAN, A COMPANY OF MICHIGAN.

FORD TRANSMISSION SPEEDOMETER DRIVE.

Application filed October 7, 1926. Serial No. 140,120.

This invention relates to a speedometer drive. The device is intended for use in connection with a driven shaft of a vehicle to effect the actuation of mechanism used for driving a speedometer or other measuring instrument.

An object of the invention is to provide an attachment carrying gearing elements, one of which is to be positioned to receive its drive from a part rotating with the driven shaft of a vehicle.

Another object is to provide a self contained unit carrying both a driven and a driving element, the unit being attachable to the transmission housing and one of gears having means to receive its rotation from the driven shaft of the transmission gearing.

Other objects will be obvious upon the reading of the following description.

Figure 1:
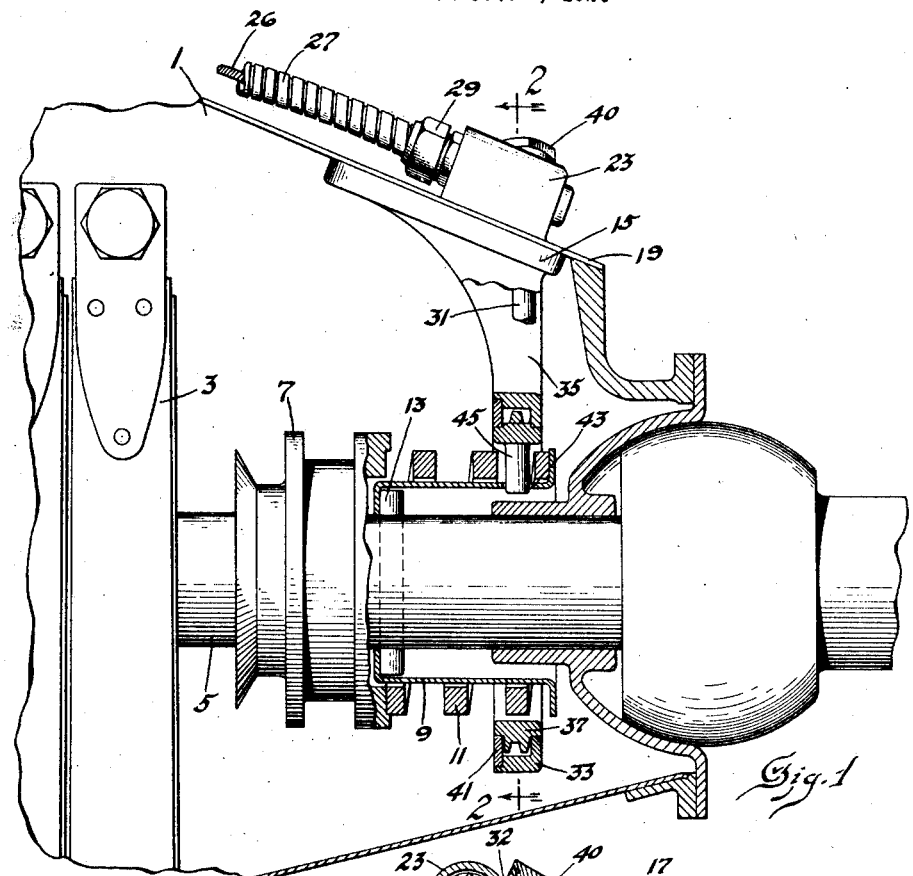

Accompanying the description is a drawing showing in Figure 1 an elevation, partly in section, of the transmission and power take-off for the speedometer.

Figure 2:
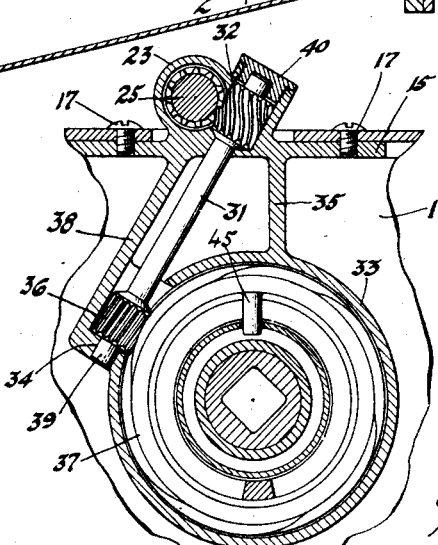

Figure 2 is a transverse section on line 2—2 of Figure 1.

Referring by reference characters to the drawing, there is illustrated a housing 1 containing a planetary type of transmission employing bands 3, a driven shaft 5, a clutch operating collar 7 associated with which is a sleeve 9 and a spring 11, the sleeve being held in position by a pin 13. The driven shaft drives the rear axle through a universal joint. These parts constitute a well-known arrangement which is not a part of this invention. It is described and illustrated inasmuch as it is in relation to these parts that the structure of this invention is associated.

The attachment includes a plate 15 which is secured by fastening means 17 to the under-side of the transmission housing cover 19. An upwardly projected part 23 extending through the housing cover serves as a shaft housing for a shaft 25 which is to be coupled to the flexible shaft 26 within the flexible shaft housing 27, the latter being secured to the housing 23 by a nut 29, as shown in Figure 1. The housing 23 is enlarged at one side to receive the end of a shaft 31 extending at an angle to shaft 25 and down into the transmission housing of the car. Suitable gearing 32 is provided between shafts 31 and 25, as shown. The attachment includes, also, a ring member 33 having connection at 35 with the plate 15. An arm 38 also extends from the part 15 and tangentially unites with ring 33. At the point of junction of the arm 38 with the ring 33 there is formed a bearing 34 for the end 39 of shaft 31. There is a plug 40 threaded into the enlargement of part 23 above the end of shaft 31. A pinion 36 on the end of shaft 31 is in mesh with a spiral gear 37 rotatable within the ring 33. The ring is shown as angular in section. One annular surface of the spiral gear rests on the side wall of the ring 33 and an annular member 41 is secured to ring 33 to complete the enclosure of gear 37. As shown in Figure 1 the opposite annular face of gear 37 may rest on the annular member 41.

In the motor vehicle using this sort of transmission and clutch the sleeve 9 is formed with a hole 43 through which the pin 13 is entered in assembling the parts. By this invention the spiral gear 37 is provided with a radially disposed pin 45 which is projected into the hole 43 whereby the rotary movement of the sleeve 9 with shaft 5 is communicated to the annular gear 37. It should be noted that except for the connection between the spiral gear 37 and the sleeve 9 afforded by the pin 45 the gear 37 is wholly free from the connection with the vehicle transmission and is entirely supported by the attachment.

In applying the attachment to the car the pin 45 is passed through the hole 43 in the sleeve and the projection 23 extends through an opening in the cover. The attachment is then secured into position by fastening means 17. The flexible drive shaft is then connected. In a construction of this kind the gearing elements are always correctly positioned relative to each other, being carried by the attachment; and the driving pin 45 is actuated by the sleeve 11 as the shaft 5 rotates. A compact unit is thus provided, the application of which to the vehicle requires no modification in the vehicle structure.

I claim:

1. In an instrument drive, a gear casing, a driven shaft therein, a removable cover therefor, a power take-off attachment positioned beneath said cover, means to secure said attachment to said cover, mechanism carried by said attachment for operating an instrument, a gear for actuating said mechanism supported by said attachment and surrounding but out of contact with said driven shaft, means whereby said gear is rotated by said shaft.

2. In an instrument drive, a gear casing, a driven shaft therein, a removable cover therefor, a cover having an opening provided therein, a power take-off attachment positioned beneath said cover, with a part extending through said opening, means to secure said attachment to said cover, mechanism carried by said attachment for operating an instrument, a gear for actuating said mechanism supported by said attachment in a position surrounding but out of contact with said driven shaft, means whereby said gear is rotated by said shaft.

3. In means for driving a measuring instrument, an attachment, a pair of shafts mounted therein, bearing between said shafts, a ring gear rotatably mounted in said attachment and having driving connection with one of said shafts, said ring gear having means projecting therefrom adapted to engage a member rotating with a driven shaft positioned within said ring gear.

4. In a speedometer drive, a housing, a driven shaft therein, an attachment having a portion to be secured to said housing and a portion surrounding said driven shaft, a ring gear in said last named portion, a projection on said ring gear in the path of movement of a member rotating with said driven shaft, gearing elements within said attachment and associated with said ring gear for driving a speedometer.

5. In an instrument drive, an attachment comprising an attaching plate and a ring member, a ring gear rotatably mounted in said ring member, a radial pin on said ring gear for placement in the path of movement of a member rotatable within said member, and gearing elements carried by said attachment and driven by said ring gear for driving an instrument.

In testimony whereof I affix my signature.

HARRY TITTENSOR.